United States Patent [19]

MacCracken

[11] Patent Number: 4,565,069
[45] Date of Patent: Jan. 21, 1986

[54] METHOD OF CYCLIC AIR CONDITIONING WITH COGENERATION OF ICE

[76] Inventor: Calvin D. MacCracken, 150 Van Brunt St., Englewood, N.J. 07631

[21] Appl. No.: 668,321

[22] Filed: Nov. 5, 1984

[51] Int. Cl.⁴ .................. F25D 25/00; F25B 27/00
[52] U.S. Cl. .................................... 62/66; 62/236; 62/238.3; 62/476
[58] Field of Search ............... 62/148, 476, 236, 238.3, 62/66, 139

[56] References Cited

U.S. PATENT DOCUMENTS 4,380,909  4/1983  Sung ........................ 62/238.3

FOREIGN PATENT DOCUMENTS 3136273  3/1983  Fed. Rep. of Germany ..... 62/238.6
3239654  5/1984  Fed. Rep. of Germany ..... 62/323.1

Primary Examiner—Henry Bennett
Attorney, Agent, or Firm—Charles J. Brown

[57] ABSTRACT

A method of air conditioning a building having a substantially lesser nighttime than daytime cooling load which comprises (a) around the clock operation of a chiller powered by heat from a fuel-fired engine which drives an electric generator, (b) during the nighttime freezing ice by the heat-operated chiller in combination optionally with an electric chiller powered by the generator, and (c) in the daytime cooling the building by the melting of the ice in combination with the heat-operated chiller and optionally in further combination with the electric chiller.

16 Claims, 1 Drawing Figure

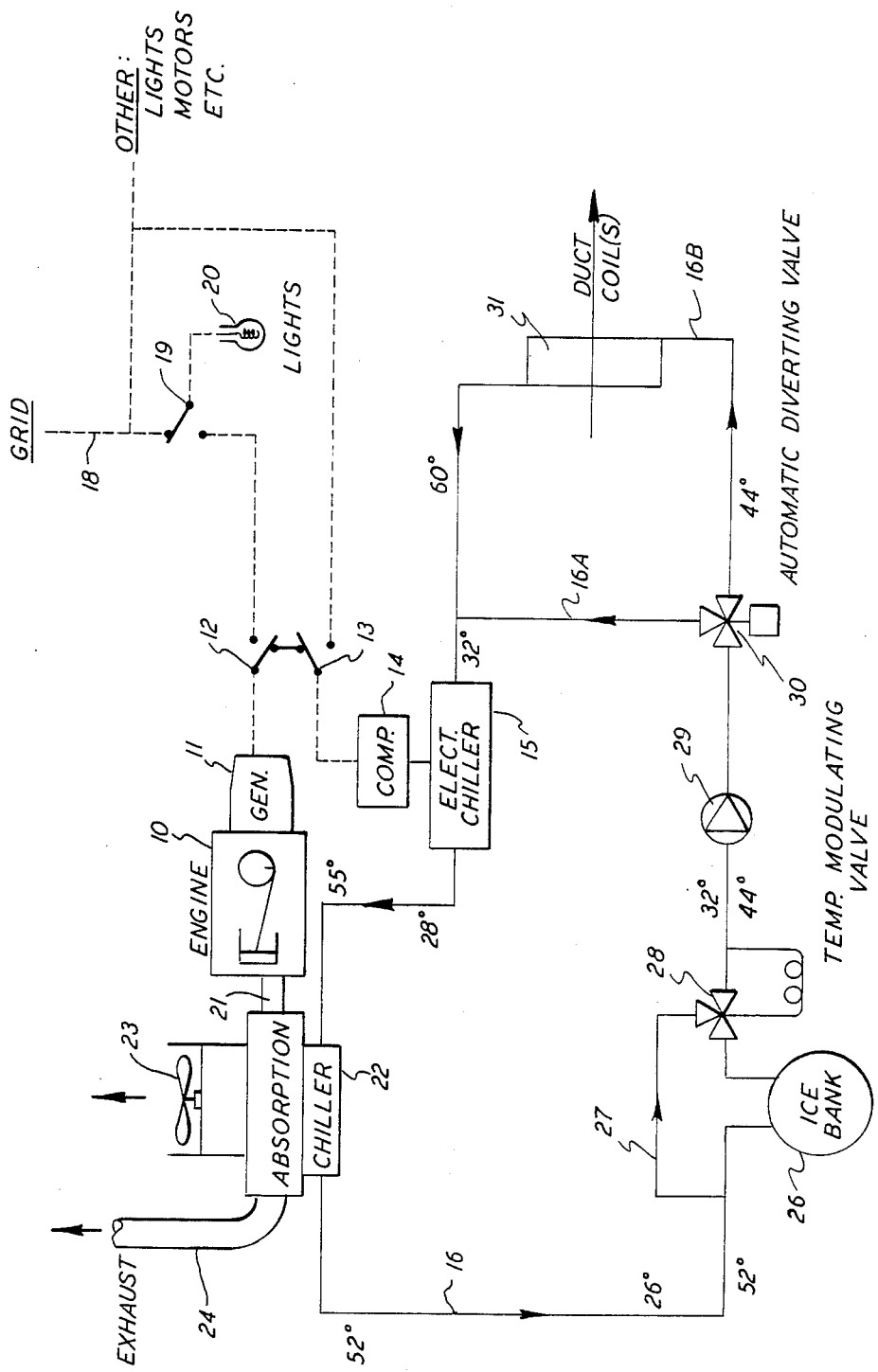

METHOD OF CYCLIC AIR CONDITIONING WITH COGENERATION OF ICE

BACKGROUND OF THE INVENTION

Many air conditioned buildings are used only cyclically with periods of high cooling load alternating with periods of low cooling load. Offices, for example, are commonly on an approximate twelve-hour daytime-nighttime cycle of use and non-use and churches have even more and longer periods of nonuse alternating with the use during a given week. The average load is thus for lower than the peak load. Even so conventional air conditioning systems for such buldings typically are sized to meet a full cooling load though such overcapacity is plainly inefficient and expensive both in initial cost and in operation. It is the purpose of the present invention to provide a cyclic load air conditioning method of maximum efficiency. The components of the system, which are not novel as such, include a heat-operated absorption chiller preferably utilizing ammonia as a refrigerant absorbed in water, an electric generator driven by a fuel-fired engine, a conventional electric chiller, and valving which includes temperature modulating valves and automatic diverting valves. An ice bank is provided in the system of the invention such as are disclosed in my U.S. Pat. Nos. 4,294,078 and 4,403,645.

By applying the concept of ice storage to buildings which have alternating periods of high and low cooling loads, the size of the components of the system can be kept to a minimum because scaled-down equipment can operate over a protracted period to store cold gradually in the ice bank and then during high cooling load operation the stored cold can augment the cooling output of the air conditioning components. The efficiency and first cost savings of the method of the invention increases with the ratio of the nonuse to use of the building and it is desirable that the period of use be no greater than the period of non-use during a given cycle. An office or other business or public place occupied for twelve hours and unoccupied for the same period each day can therefore benefit by the air conditioning method of the invention. The efficiency and first cost savings are even greater when the occupied hours are less, so that in churches, for example, where perhaps only six or eight hours of cooling during a week are required the cost savings of the method of the invention are extraordinary.

SUMMARY OF THE INVENTION

The invention provides a method of air conditioning a building having alternating periods of high and low (or zero) cooling loads. During both high and low cooling operation the method includes the steps of driving an electric generator by means of a fuel-fired engine and powering a heatoperated chiller with waste heat from the fuel-fired engine. During low cooling load operation the method includes the steps of freezing ice by means of the heat-operated chiller in combination optionally with an electric chiller powered by the generator and in the alternative by grid power. During high cooling load operation the method comprises the step of cooling the building by the melting of the ice in combination with the heat-operated chiller and optionally in further combination with the electric chiller powered by the generator and in the alternative by grid power.

In one preferred form of the method of the invention the engine is gas fired and ammonia is absorbed in water in the absorption chiller. Operation during both the high and low cooling loads may be continuous and may include the circulation of brine through a closed loop circuit containing the heat-operated chiller, an ice bank, building duct coil means, and the electric chiller powered by the generator. The method also provides that during off-peak cooling load periods the electric chiller may be disconnected and the building cooled by a combination only of the heat-operated chiller and the melting ice, the electricity otherwise consumed by the electric chiller than being supplied directly from the generator to the building for other than cooling purposes. However, when electricity is supplied to the building for other than cooling purposes in this manner it is to be without interconnection between the generator and grid power.

BRIEF DESCRIPTION OF THE DRAWING

The single FIGURE of the drawing is a schematic circuit diagram of the components of the system for practicing the method of the invention.

DESCRIPTION OF PREFERRED EMBODIMENT

The system for practicing the invention as illustrated in the drawing includes a fuel-fired engine 10 which drives an electric generator 11. Natural gas is the preferred fuel for the engine 10 though it could be fired by propane or even petroleum fuels. The generator 11 supplies electrical power through a circuit which includes two double-pole switches 12 and 13. In the position of the switches 12 and 13 shown in the drawing the output of the generator 11 is delivered to an electic compressor 14 associated with an electric chiller 15. The electric chiller 15, in which the refrigerant may be Freon or equivalent consists of two heat exchangers, one of which rejects heat and the other of which chills a brine circulating in a closed loop heat exchange circuit 16 in the direction shown by the arrows in the drawing.

If the switch 13 is thrown to its position opposite that shown in the drawings, the electric compressor 14 is then powered from a power grid 18. The grid 18 may also be interconnected by a third double-pole switch 19 to lights 20 or other electrical components in the building to be air conditioned. The switches 12, 13 and 19 are shown in schematic form only to illustrate the preferred characteristic of the invention that the electrical power from the generator 11 may be used to drive the electric compressor 14 or to power the lights 20 and other electrical components of the building to be air conditioned but the electrical power from the generator 11 is not intended to be interconnected with the grid power 18. This avoids the expensive grid interfacing hardware necessary to sychronize properly a small power source with the grid. The method of this invention therefore does not include for its efficiency the sale of power back to the grid as in some prior art cogeneration systems.

In an exhaust 21 of the fuel-fired engine 10 exhaust fumes exit at approximately 1100 to 1300 degrees F. This hot exhaust is directed into a heat-operated absorption chiller 22 cooled by an electric fan 23 which may be powered by the generator 11. The hot gases exit from the absorption chiller 22 through fan exhaust 24 at approximately 400 to 500 degrees F. The refrigerant pair in the absorption chiller 22 is preferably ammonia as a refrigerant and water as the absorber because cold water is capable of absorbing a great deal of ammonia over a wider temperature range than other absorption pairs such as water and lithium bromide. The mixture of ammonia and water is heated by the hot gases and the ammonia gas is driven off under pressure and high temperature. The ammonia is cooled and condensed to a liquid and then expanded through an evaporator to a lower temperature to be absorbed again in water and pumped back up to pressure. These components and principles of operation of an absorption chiller are known in the art. The ammoniawater pair is preferred because it can be operated both higher and lower in the temperature range accomplishing two things which other common absorption pairs cannot provide: air cooling of the condenser on the high side and providing ice making temperatures on the low side. It is also desirable because of its thermal efficiency and because it can produce hot water from engine cooling or exhaust heat exchange (not shown) which can be utilized in the building, though an exhaust to the out-of-doors must be employed and steel rather than copper must be used for the component materials.

The brine circuit 16 mentioned previously in connection with the electric chiller 15 includes the absorption chiller 22. The term "brine" is used generically to include any antifreeze liquid which can be taken to a temperature below the freezing temperature of water, and a twenty-five percent solution of ethylene glycol in water is particularly suitable.

Following the absorption chiller 22 the next element in the brine circuit 16 is an ice bank 26 in which relatively large volumes of water can be frozen and thawed as taught for example in my U.S. Pat. Nos. 4,294,078 and 4,403,645. If the brine in the circuit 16 is of a temperature below the freezing point of water it will create additional ice in the ice bank 26 and if it is above the freezing temperature of water it will be cooled by the ice previously formed in the ice bank 26. A by-pass 27 is provided in the circuit 16 and it reconnects with the circuit at a temperature modulating valve 28 downstream from the ice bank 26. The function of the temperature modulating valve 28 is described hereinafter. Downstream from it in the brine circuit 16 is a pump 29 and then an automatic diverting valve 30. The automatic diverting valve can direct brine through a circuit link 16A back to the electric chiller 15 or through a circuit link 16B through one or more air conditioning duct coils 31 in the building to be cooled.

The word "ice" as used above and hereafter, including its use in the claims herein, is to be understood as referring to any phase- change material which melts and freezes. Water, of course, is the most common form of such a material but other substances which melt from a solid to a liquid and which freeze from a liquid to a solid are included. Both eutectic and non-eutectic materials come within this definition of "ice".

In the following description of the practice of the method, typical brine temperatures are entered in the drawing with those on the outside of the line indicating the circuit 16 and 16B designating the temperature during the period of high cooling load (as for example daytime load) and the temperatures on the inside of the circuit line 16 and 16A designating those which are typical of operation during the low cooling load (for example nighttime load). Throughout both the high and low cooling load periods, for example during both daytime and nighttime operation, and in most cases without any interruption at all, the fuel-fired engine 11 operates to drive the absorption chiller 22. The brine temperature in the circuit 16 is to be taken down during the low cooling load for nighttime condition to approximately 26 degrees F. and if this is beyond the capacity of the absorption chiller 22 alone then the switches 12 and 13 are positioned such that the electric generator 11 also driven by the engine 10, supplies power to the compressor 14 of the electric chiller 15 to augment the cooling of the brine. The brine passes through the ice bank 26 during the low (or zero) cooling load or nighttime phase of the operation and freezes and stores ice therein. A typical exiting temperature of the brine from the ice bank 26 is 32 degrees F. as it passes through the modulating valve 28 and the pump 29 and then is directed to the circuit link 16A by the automatic diverting valve 30 so that it is carried back to the electric chiller 15. In the example shown the brine temperature is taken down from 32 degrees F. to 28 degrees F. for return to the absorption chiller 22.

In the high cooling load phase of the operation, for example as during the daytime when the building in question is to be air conditioned, the out temperature of the brine in the circuit 16 exiting from the absorption chiller 22 is approximately 52 degrees F. The temperature modulating valve 28 causes a substantial portion of the brine at that temperature to be directed through the by-pass 27 so that in combination with that portion of the brine that passes through the ice bank 26 the output into the pump 29 is at 44 degrees F. As the day proceeds the brine by-passing the ice bank 27 is progressively decreased by the temperature modulating valve 28 to maintain a substantially constant 44 degrees F. output temperature. The automatic diverting valve is such that the brine at 44 degrees F. is passed through the circuit link 16B and into the air conditioning duct coils 31 of the building where after giving up its cold (absorbing heat) it returns to the electric chiller 15 at a temperature of 60 degrees F. If the electric chiller is connected to the generator 11 and is operating the temperature of the brine is taken down to 55 degrees F. for return to the absorption chiller 22.

In both high or low cooling load periods, which is to say in either the daytime or nighttime, the use of the electric chiller 15 is only optional and may not be necessary. The generator 11 is at all times powered by the engine 10, however, and hence when the electric chiller 15 is not in use the electric power it would otherwise consume is directed by an appropriate setting of the switchs 12 and 19 to the lights 20 or other components of the building. It is more likely that this will occur during the daytime operation of the system since there may be no other night electric load than the electric chiller and it is most cost-effective to run the engine/generator at full load. If the ice bank becomes full of ice, the engine/generator is shut off until the ice is melted. In the winter heating season the heat operated absorption chiller is run in a heating mode as is well known. As noted previously, the switches 12, 13 and 19 are to be positioned such that the electric generator is never interconnected with the grid power 18.

In general it is the purpose of this method to operate the engine 10 and generator 11 virtually if not entirely around the clock, either making ice in the ice bank 26 or cooling the building by means of the duct coil 31 or by delivering power to the lights 20 in the building without interconnection with the grid 18. This continual operation of the relatively small scale engine 10 and the generator 11, and the equally small scale absorption chiller 22 which it is always powering, is the crux of the cost effectiveness of the system. Typically one-sixth of the peak cooling is generated by the absorption chiller 22, one-half by the ice bank 26 and one-third from the electric chiller 15. The initial cost of the entire system is probably not greater than, and in some cases is less than a standard air conditioning system for a building even though the system of the invention includes an ice bank and an engine/generator. The savings in electric power cost during the operation are considerable as compared to a standard air conditioning system and further savings are effected by the use of natural gas as part of the total energy source. A further advantage is that the system provides a back-up emergency electric power source for lights in the building.

The scope of the invention is to be determined from the following claims rather than the preferred embodiment described above.

I claim:

1. A method of air conditioning a building having alternating periods of high and low cooling loads which comprises
   (a) during both high and low cooling load operation the steps of
      i. driving an electric generator by means of a fuel-fired engine, and
      ii. powering a heat-operated chiller with waste heat from said fuel-fired engine;
   (b) during low cooling load operation the step of
      i. freezing ice by means of said heatoperated chiller in combination if needed with an electric chiller powered by one of said generator and grid power; and
   (c) during high cooling load operation the step of
      i. cooling the building by the melting of said ice in combination with the heat-operated chiller and if needed in further combination with said electric chiller powered by one of said generator and grid power.

2. A method according to claim 1 wherein the heat-operated chiller is an absorption chiller powered by exhaust gases from said fuel-fired engine.

3. A method according to claim 2 wherein the engine is gas fired.

4. A method according to claim 2 wherein ammonia is absorbed in water in the absorption chiller.

5. A method according to claim 1 which includes the high cooling load operation step during off-peak days of
   (a) disconnecting the electric chiller,
   (b) cooling the building by a combination only of the heat-operated chiller and said melting ice, and
   (c) supplying electricity otherwise consumed by the electric chiller directly from the generator to the building for other than cooling purposes.

6. A method according to claim 5 wherein the supplying of electricity to the building for other than cooling purposes is without interconnection between the generator and grid power.

7. A method of air conditioning a building having alternating periods of high and low cooling loads which comprises
   (a) during both high and low cooling load operation the continuous steps of
      i. driving an electric generator by means of a fuel-fired engine,
      ii. powering a heat-operated chiller with waste heat from said fuel-fired engine, and
      iii. circulating brine through a closed loop circuit containing said heat-operated chiller, an ice bank, a building duct coil and an electric chiller powered by one of said generator and grid power;
   (b) during low cooling load operation the steps of
      i. chilling the brine by means of said heat-operated chiller in combination if needed with said electric chiller powered by one of said generator and grid power, and
      ii. freezing ice in the ice bank by means of the chilled brine; and
   (c) during high cooling load operation the steps of
      i. chilling the brine by the melting of said ice in combination with the heat-operated chiller and if needed in further combination with the electric chiller, and
      ii. cooling the building by directing the chilled brine through at least one duct coil.

8. A method according to claim 7 which includes the high cooling load operation step of
   (a) by-passing the ice bank with some of the circulating brine, and
   (b) progressively decreasing the amount of brine by-passing the ice bank as the ice melts to maintain a substantially constant brine temperature entering the duct coil.

9. A method according to claim 7 wherein the heatoperated chiller is an absorption chiller powered by exhaust gases from said fuel-fired engine.

10. A method according to claim 9 wherein the engine is gas fired.

11. A method according to claim 9 wherein ammonia is absorbed in water in the absorption chiller.

12. A method according to claim 7 which includes the high cooling load operation step during off-peak days of
   (a) disconnecting the electric chiller,
   (b) cooling the building by a combination only of the heat-operated chiller and said melting ice, and
   (c) supplying electricity otherwise consumed by the electric chiller directly from the generator to the building for other than cooling purposes.

13. A method according to claim 12 wherein the supplying of electricity to the building for other than cooling purposes is without interconnection between the generator and grid power.

14. A method of air conditioning a building having alternating periods of high and low cooling loads wich comprises
   (a) during both high and low cooling load operation the continuous steps of
      i. driving an electric generator by means of a gas fired engine,
      ii. powering with exhaust gases from said gas-fired engine a heat-operated absorption chiller utilizing ammonia as a refrigerant absorbed in water, and
      iii. circulating brine through a closed loop circuit containing said heat-operated chiller, an ice bank, building duct coil means and an electric chiller powered by one of said generator and grid power;
   (b) during low cooling load operation the steps of
      i. chilling the brine by means of said heat-operated chiller in combination with said electric chiller powered by said generator,
      ii. freezing ice in the ice bank by means of the chilled brine; and
   (c) during high cooling load operation the steps of i. chilling the brine by the melting of said ice in combination with the heat-operated chiller and if needed in further combination with the electric chiller, and ii. cooling the building by directing the chilled brine through the duct coil means, iii. by-passing the ice bank with some of the circulating brine, and iv. progressively decreasing the amount of brine by-passing the ice bank as daytime operation continues to maintain a substantially constant brine temperature entering the building duct coil means.

15. A method according to claim 14 which includes the high cooling load operation step during off-peak days of (a) disconnecting the electric chiller, (b) cooling the building by a combination only of the heat-operated chiller and said melting ice, and (c) supplying electricity otherwise consumed by the electric chiller directly from the generator to the building for other than cooling purposes.

16. A method according to claim 15 wherein the supplying of electricity to the building for other than cooling purposes is without interconnection between the generator and grid power.

* * * * *